United States Patent
Prinzo

(10) Patent No.: US 9,545,054 B2
(45) Date of Patent: Jan. 17, 2017

(54) MECHANISMS AND RELATED METHODS FOR DRIVE BY WIRE CONTROL SYSTEMS IN WALK-BEHIND WORKING MACHINES

(71) Applicant: Honda Motor Co., Ltd., Tokyo (JP)

(72) Inventor: Vincent Andrew Prinzo, Hillsborough, NC (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/520,667

(22) Filed: Oct. 22, 2014

(65) Prior Publication Data
US 2016/0113194 A1 Apr. 28, 2016

(51) Int. Cl.
*A01D 69/00* (2006.01)
*A01D 34/82* (2006.01)
*A01D 34/76* (2006.01)

(52) U.S. Cl.
CPC ............. *A01D 34/828* (2013.01); *A01D 34/76* (2013.01)

(58) Field of Classification Search
CPC ... B60K 28/10; B60K 28/00; B60K 2028/003; B60L 3/0092; B60W 10/08; B62D 51/002; B62D 51/04; A01D 2034/6843; A01D 34/828
USPC ...... 477/174, 170, 906, 166; 180/19.3, 65.8; 56/10.8, 10.5, 11.3
See application file for complete search history.

(56) References Cited

U.S. PATENT DOCUMENTS

| | | | |
|---|---|---|---|
| 3,841,069 A | 10/1974 | Weck | |
| 3,955,653 A * | 5/1976 | Comer | A01D 34/6806 188/273 |
| 3,961,544 A | 6/1976 | Phillips | |
| 4,181,206 A * | 1/1980 | Seilenbinder | A01D 34/6806 192/129 A |
| 4,295,327 A | 10/1981 | Bortolussi | |
| 4,335,566 A * | 6/1982 | Hurd | A01D 34/6806 56/11.3 |
| 4,440,277 A * | 4/1984 | Thomson | F16D 67/06 192/12 D |
| 5,335,487 A | 8/1994 | Murakawa et al. | |
| 5,784,868 A | 7/1998 | Wadzinski et al. | |
| 6,105,348 A * | 8/2000 | Turk | A01D 34/68 180/19.3 |
| 6,386,169 B1 | 5/2002 | Gracyalny et al. | |
| 6,405,513 B1 * | 6/2002 | Hancock | A01D 34/6806 56/10.8 |
| 6,591,593 B1 * | 7/2003 | Brandon | A01D 34/006 56/10.6 |
| 6,758,030 B2 * | 7/2004 | Dettmann | A01D 34/58 56/10.8 |

(Continued)

*Primary Examiner* — Árpád Fábián-Kovács
(74) *Attorney, Agent, or Firm* — Jenkins, Wilson, Taylor & Hunt, P.A.

(57) ABSTRACT

Mechanisms for drive by wire control systems in walk-behind working machines can include a sensor and at least one resilient member. The sensor can be rotatable about a sensor axis and can be in communication with a control unit, while the at least one resilient member can cooperate with the sensor to bias the sensor about the sensor axis. Furthermore, the control unit can be configured to control an operating state of a transmission of the walk-behind machine. In addition, the mechanism can be configured such that if the drive by wire control system becomes inoperative, a change in the operating state of the transmission occurs, such that the transmission is non-operational if the drive by wire control system becomes inoperative.

10 Claims, 11 Drawing Sheets

(56) References Cited

U.S. PATENT DOCUMENTS

| | | | |
|---|---|---|---|
| 6,796,392 B2* | 9/2004 | Kobayashi | B62D 51/04 180/19.3 |
| 6,816,770 B1 | 11/2004 | Lin | |
| 6,904,740 B2 | 6/2005 | Derby, V et al. | |
| 7,293,397 B2* | 11/2007 | Osborne | A01D 34/824 56/10.8 |
| 7,478,689 B1* | 1/2009 | Sugden | A01D 34/67 180/19.3 |
| 7,591,126 B2 | 9/2009 | Cox | |
| 8,312,946 B2* | 11/2012 | Lahey | A01D 34/824 180/19.1 |
| 2003/0000190 A1* | 1/2003 | Busboom | A01D 34/6806 56/10.8 |
| 2003/0000192 A1* | 1/2003 | Busboom | A01D 34/6806 56/10.8 |
| 2003/0056481 A1* | 3/2003 | Trefz | A01D 34/6806 56/11.1 |
| 2003/0144774 A1* | 7/2003 | Trissel | A01D 34/008 701/23 |
| 2004/0201288 A1* | 10/2004 | Harvey | A01D 34/828 307/327 |
| 2005/0066643 A1* | 3/2005 | Fukushima | A01D 34/006 56/16.7 |
| 2005/0072132 A1* | 4/2005 | Dettmann | A01D 34/58 56/10.8 |
| 2006/0211540 A1* | 9/2006 | Moriyama | A01D 34/6806 477/166 |
| 2007/0275821 A1* | 11/2007 | Kawakami | A01D 34/6812 477/107 |
| 2009/0065273 A1* | 3/2009 | Wyatt | B60L 3/00 180/65.8 |
| 2011/0126502 A1* | 6/2011 | Pitman | A01D 34/68 56/10.8 |
| 2013/0111865 A1 | 5/2013 | Hansen et al. | |

* cited by examiner

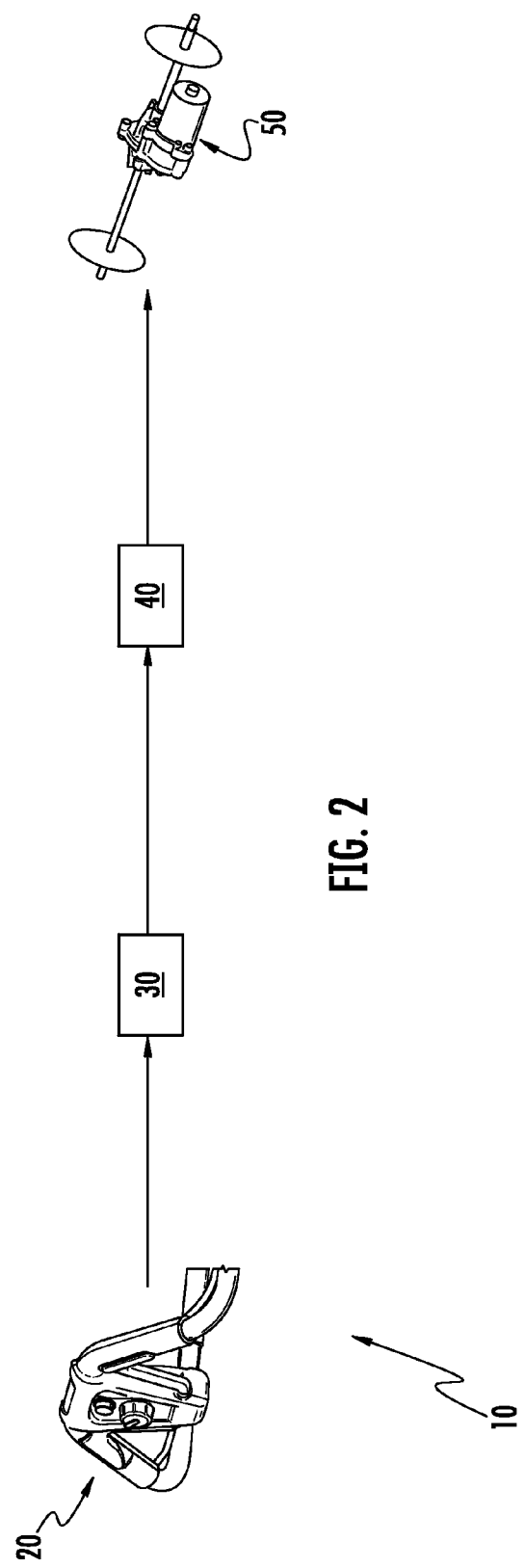

MECHANISMS AND RELATED METHODS FOR DRIVE BY WIRE CONTROL SYSTEMS IN WALK-BEHIND WORKING MACHINES

TECHNICAL FIELD

The present subject matter generally relates to drive by wire control systems and related methods for walk-behind working machines. More particularly, the subject matter disclosed herein relates to mechanisms and related methods for drive by wire control systems in walk-behind working machines such as lawnmowers.

BACKGROUND

In typical walk-behind working machines, such as, for example and without limitation, mowing machines or lawnmowers, mechanical control systems can be used to control machine components, such as transmissions. For example, mechanical control systems can comprise mechanical linkages (e.g. cables) that can be used to actuate transmission clutches operated by mechanical operator controls. Such mechanical control systems have the advantage that if any components become inoperative; the walk-behind working machines will stop.

Currently, walk-behind working machines are now being developed with drive by wire control systems to control transmissions. Typical drive by wire control systems use electrical or electro-mechanical systems for performing vehicle functions. For example, instead of mechanical linkages, these drive by wire control systems actuate their transmissions using electrical signals. However, one disadvantage of these newly developed drive by wire control systems, in comparison with purely mechanical control systems, is that extra care must be taken to ensure that if any components become inoperative, the walk-behind working machines will stop.

As a result, a need exists for drive by wire control systems that comprise features and/or mechanisms to act as a fallback in case any of the components become inoperative. Specifically, a need exists to ensure that transmissions of these walk-behind working machines will be non-operational if their drive by wire control systems become inoperative.

SUMMARY

In accordance with this disclosure, mechanisms and related methods for drive by wire control systems in walk-behind working machines are provided. The mechanisms and related methods for drive by wire control systems in walk-behind working machines can provide advantageous and unexpected results, including, for example, fallback mechanisms that can render the drive systems or transmissions in the walk-behind working machines non-operational when necessary.

In one aspect, a mechanism for a drive by wire control system in a walk-behind working machine is disclosed. The mechanism can comprise a sensor and at least one resilient member. The sensor can be rotatable about a sensor axis and can be in communication with a control unit, while the at least one resilient member can cooperate with the sensor to bias the sensor about the sensor axis. Furthermore, the control unit can be configured to control an operating state of a transmission of the walk-behind machine. In addition, the mechanism can be configured such that if the drive by wire control system becomes inoperative, a change in the operating state of the transmission can occur, such that the transmission can be non-operational if the drive by wire control system becomes inoperative.

In another aspect, a walk-behind working machine comprising a mechanism for a drive by wire control system is disclosed. The walk-behind working machine can comprise a sensor and at least one resilient member. The sensor can be rotatable about a sensor axis and can be in communication with a control unit, while the at least one resilient member can cooperate with the sensor to bias the sensor about the sensor axis. Furthermore, the control unit can be configured to control an operating state of a transmission of the walk-behind machine. In addition, the mechanism can be configured such that if the drive by wire control system becomes inoperative, a change in the operating state of the transmission can occur, such that the transmission can be non-operational if the drive by wire control system becomes inoperative.

In another aspect, a method for operating a drive by wire control system in a walk-behind working machine is disclosed. The method can comprise rotating a sensor about a sensor axis. The method can further comprise communicating a control signal to a control unit, where the control signal can correspond to a magnitude of rotation of the sensor about the sensor axis. The method can additionally comprise controlling an operating state of a transmission of the walk-behind machine such that if the drive by wire control system becomes inoperative, a change in the operating state of the transmission can occur, such that the transmission can be non-operational if the drive by wire control system becomes inoperative.

These and other objects of the present disclosure as can become apparent from the disclosure herein are achieved, at least in whole or in part, by the subject matter disclosed herein.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 2 is a schematic representation illustrating a drive by wire control system in a walk-behind working machine according to an embodiment of the presently disclosed subject matter;

DETAILED DESCRIPTION

Figure 1:
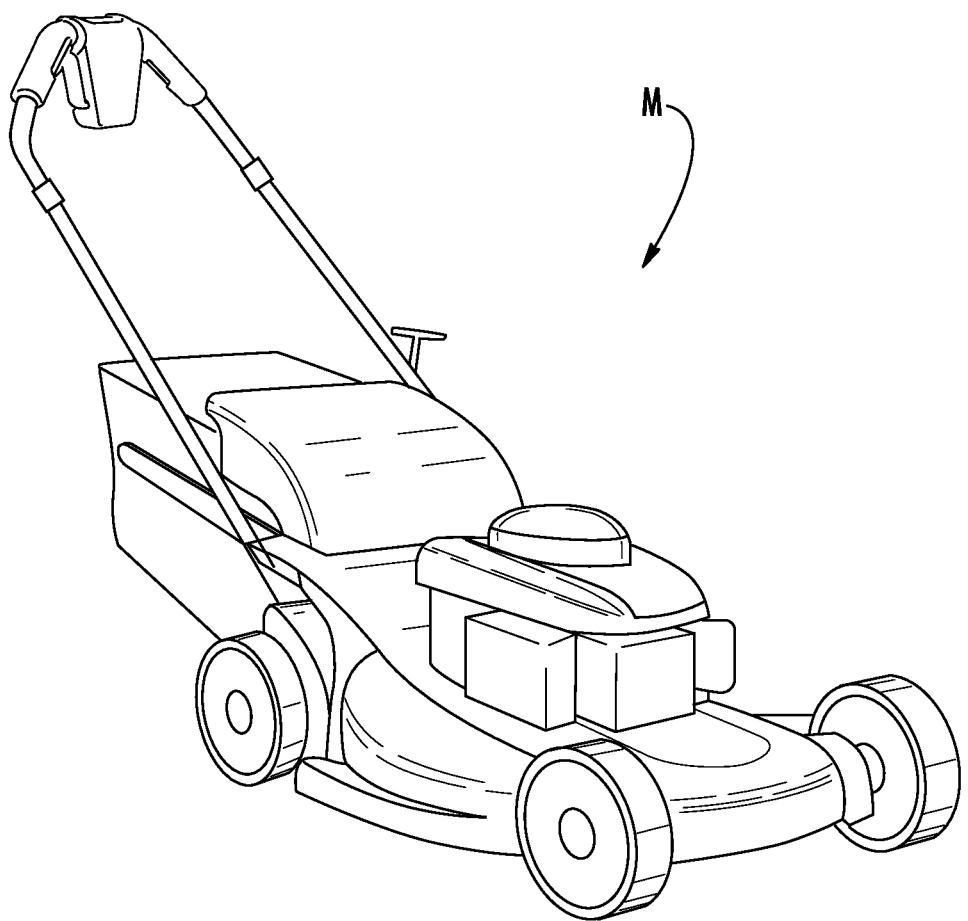
FIG. 1 is a perspective view illustrating a walk-behind working machine according to an embodiment of the presently disclosed subject matter.

The present subject matter provides and/or includes mechanisms and related methods for drive by wire control systems in walk-behind working machines. In some aspects, the mechanisms and the related methods can be used in powered machines having transmissions controlled by electrical signals, such as, for example, a transmission in a walk-behind mowing machine. In some aspects, the systems and related methods described herein can comprise controls configured to start and/or turn off control aspects of the transmission.

In some aspects, the one or more controls can electrically communicate with the transmission via an electronic control unit (ECU). In some aspects, the subject matter described herein may be implemented in software in combination with hardware and/or firmware. For example, the subject matter described herein may be implemented in software executed by a processor (e.g., a hardware-based processor), microprocessor, and/or microcontroller of electric control unit. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, logic devices, logic transistors, chip memory devices, programmable logic devices, such as field programmable gate arrays, and application specific integrated circuits. In addition, a computer readable medium that implements the subject matter described herein may be located on a single device or computing platform or may be distributed across multiple devices or multiple computing platforms.

As used herein, the term "signal" and "pulse" are generic to multiple forms of communication, unless otherwise specified. For example, "signal" and "pulse" can include electrical, digital or analog signals or pulses. Additionally, in some embodiments, other forms of communication may be included.

As used herein, the term "sensor" is generic to a variable resistor, more specifically, for example, a potentiometer or a Hall Effect sensor.

Aspects of the present subject matter will now be described more fully hereinafter with reference to the accompanying drawings, in which some aspects of the present subject matter are shown. This present subject matter may, however, be embodied in many different forms and should not be construed as limited to the embodiments set forth herein. Like numbers refer to like elements throughout.

As illustrated in the various figures, some sizes of structures or portions may be exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the structure or portion in addition to the orientation depicted in the figures. For example, if the structure in the figures is turned over, structure or portions described as "above" other structures or portions would now be oriented "below" the other structures or portions. Likewise, if the structure in the figures is rotated along an axis, structure or portions described as "above", other structures or portions would be oriented "next to" or "left of" the other structures or portions.

Unless the absence of one or more elements is specifically recited, the terms "comprising", including", and "having" as used herein should be interpreted as open-ended terms that do not preclude the presence of one or more elements.

A walk-behind working machine M is illustrated in FIG. 1. In FIG. 1, walk-behind working machine M is, for example, a mowing machine or a lawnmower, but walk-behind working machine M can be any other kind of self-propelled walk-behind working machine. Walk-behind working machine M can comprise a control system for controlling the working component(s) of walk-behind working machine M. In one aspect, walk-behind working machine M can comprise a drive by wire control system. Unlike a typical drive by wire control system, a drive by wire control system for walk-behind working machine M can incorporate a mechanism to ensure that if any component of drive by wire control system becomes inoperative, working machine M can stop working; specifically, no control signal can be sent to a transmission of machine M.

For example, a drive by wire control system, generally designated 10, of the present subject matter is similar to the controls implemented in a mechanical control system, where a clutch is operated by mechanical operator controls. However, in drive by wire control system 10 the controls are electric or electro-mechanical. In a typical mechanical control system, if any part of the system breaks, the transmission will stop, whereas in a conventional drive by wire control system, if any part of the system breaks, the transmission may not stop. As a result, drive by wire control system 10 is the most advantageous combination of a drive by wire control system and a mechanical system because drive by wire control system 10 incorporates the mechanical elements of mechanical control systems with the improved response times inherent in conventional drive by wire control systems.

As shown in FIG. 2, for example, drive by wire control system 10 for walk-behind working machine M is provided, where drive by wire control system 10 can comprise a clutch control 20 that can be configured to communicate with a sensor 30, a control unit 40 that can receive a communicated control signal from sensor 30, and a machine component or transmission 50 that can be controlled by an output of control unit 40.

Drive by wire control system 10 can further comprise a mechanism 80 that can incorporate components of clutch control 20, sensor 30, and control unit 40. Each component of mechanism 80 will be described in detail below. However, one of ordinary skill in the art can understand that the below description is only of some embodiments of mechanism 80 for drive by wire control system 10 according to the present subject matter.

Figure 3A:
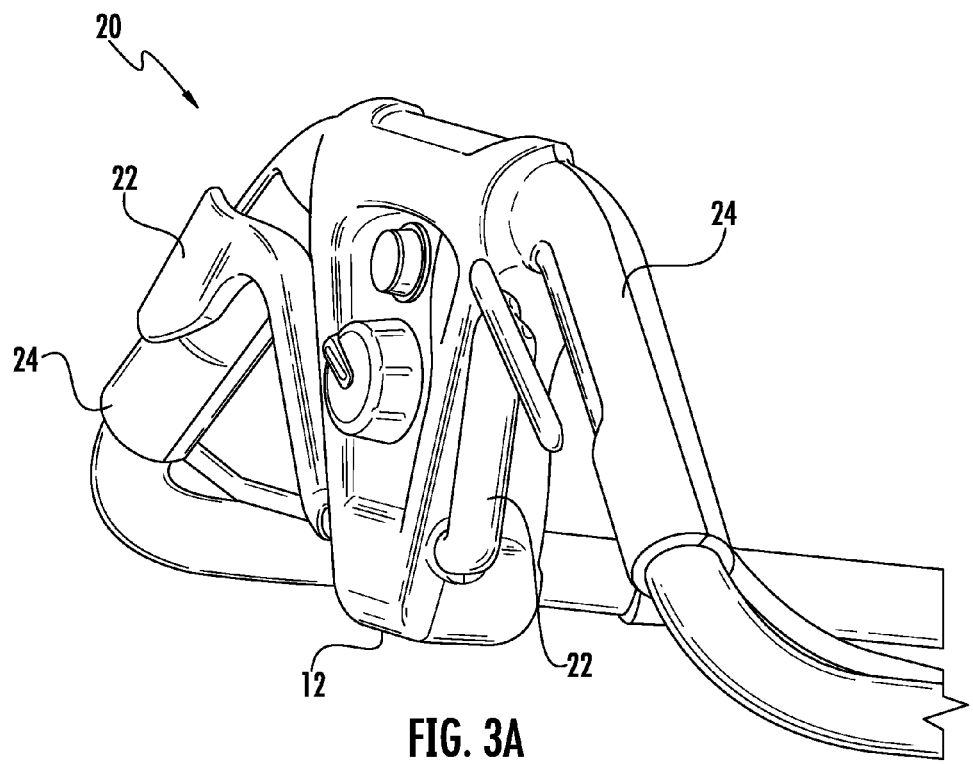
FIG. 3A is a front perspective view illustrating a clutch control of a drive by wire control system in a first angular position according to an embodiment of the presently disclosed subject matter.
Figure 3B:
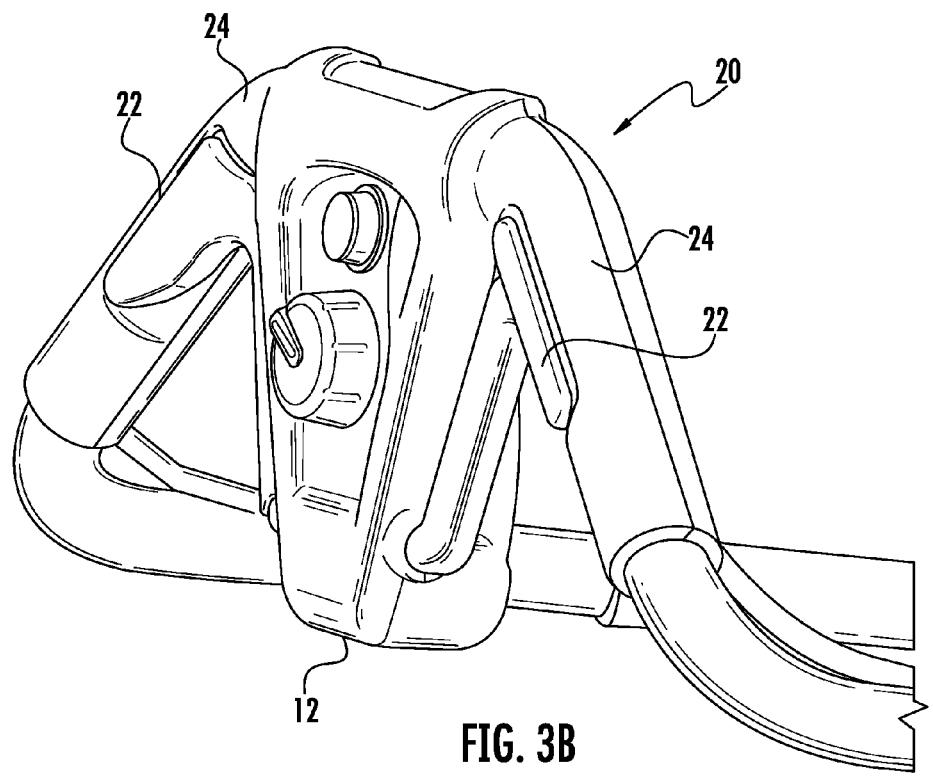
FIG. 3B is a front perspective view illustrating a clutch control of a drive by wire control system in a second angular position according to an embodiment of the presently disclosed subject matter.

FIGS. 3A and 3B are illustrative of an exemplary embodiment of clutch control 20. For example, clutch control 20 can comprise a handle 24 configured to be gripped by an operator during operation of working machine M, to which handle 24 is connected. A housing 12 can be integral to or otherwise form handle 24, and a clutch lever 22 can be pivotably movable with respect to housing 12 and handle 24. In this general configuration, clutch lever 22 can be moved to control operation of a machine component, such as, for example, transmission 50 for a self-propel system of working machine M.

In particular, clutch lever 22 can be configured to be selectively pivotable between a range of angular positions with respect to housing 12 and/or handle 24, where each angular position can correspond to a control signal value transmitted to transmission 50. In one aspect, clutch lever 22 can comprise two lever arms, each having a first end approximate to a pivot point of clutch lever 22 and a second end substantially opposing the first end, which comprises a grip portion. As shown in FIGS. 3A and 3B, clutch lever 22 can have a substantially L-shaped profile, with the grip portion extending for example at a non-zero angle (e.g. about 50 and 90 degrees) away from each lever arm. This angular arrangement can allow the operator to grasp the grip portion in a comfortable hand position and pivot clutch lever 22 with respect to handle 24.

In this regard, to control the operation of the associated machine component (e.g., transmission 50), clutch lever 22 can be selectively pivoted with respect to handle 24 between a first angular position (see, e.g., FIG. 3A) at which the grip portion of clutch lever 22 is spaced apart from handle 24 by a first angle and a second angular position (see, e.g., FIG. 3B) at which the grip portion is comparatively closer to handle 24. For example, the first angle can be 30 degrees. This pivoting movement of clutch lever 22 can be configured to correspondingly cause changes in the operating state of connected machine component 50. In particular, for example, machine component 50 can be configured to be in a non-operational or OFF state when clutch lever 22 is in the first angular position and in a high-speed or MAX state when clutch lever 22 is in the second angular position. For example, where machine component 50 is a transmission for working machine M, the first angular position can be a default or resting state (i.e., no voltage applied), and the second operating state can be a selected high-speed state (i.e., maximum voltage applied to transmission 50, such that working machine M is moved at a predetermined cruising speed).

Furthermore, those having skill in the art will recognize that clutch lever 22 can additionally be pivoted to any of a variety of intermediate angular positions, generally designated a third angular position, to correspondingly operate machine component 50 in intermediate operating states (e.g., voltage applied to the transmission 50 is within a range of normal operating voltage). In this way, the operator can selectively operate transmission 50 at states between the OFF and MAX operating states. For example, the third angular position can comprise clutch lever 22 being spaced apart from handle 24 by a second angle that is smaller than the first angle formed when clutch lever 22 is in the first angular position, but greater than a minimal angle at which clutch lever 22 is spaced apart from handle 24 at the second angular position.

To help the operator maintain clutch lever 22 in the second angular position, at least a portion of the grip portion can be designed to be positioned within a recess that is formed in an edge of handle 24 when clutch lever 22 is in the second angular position. In the particular configuration shown in FIGS. 3A-3B, for example, the recess can be designed to be large enough such that the grip portion can be nested substantially entirely within the recess. In this way, pivoting clutch lever 22 to the second angular position can involve pivoting clutch lever 22 into a position in which a top surface of the grip portion of clutch lever 22 is substantially aligned with an outer top surface of handle 24 (e.g., surfaces substantially flush or even with one another). In this way, the combination of handle 24 and the grip portion of clutch lever 22 can fit together such that the operator can comfortably hold clutch lever 22 in a substantially fixed manner at the second angular position by squeezing the grip portion of clutch lever 22 into the recess of handle 24.

Figure 4A:
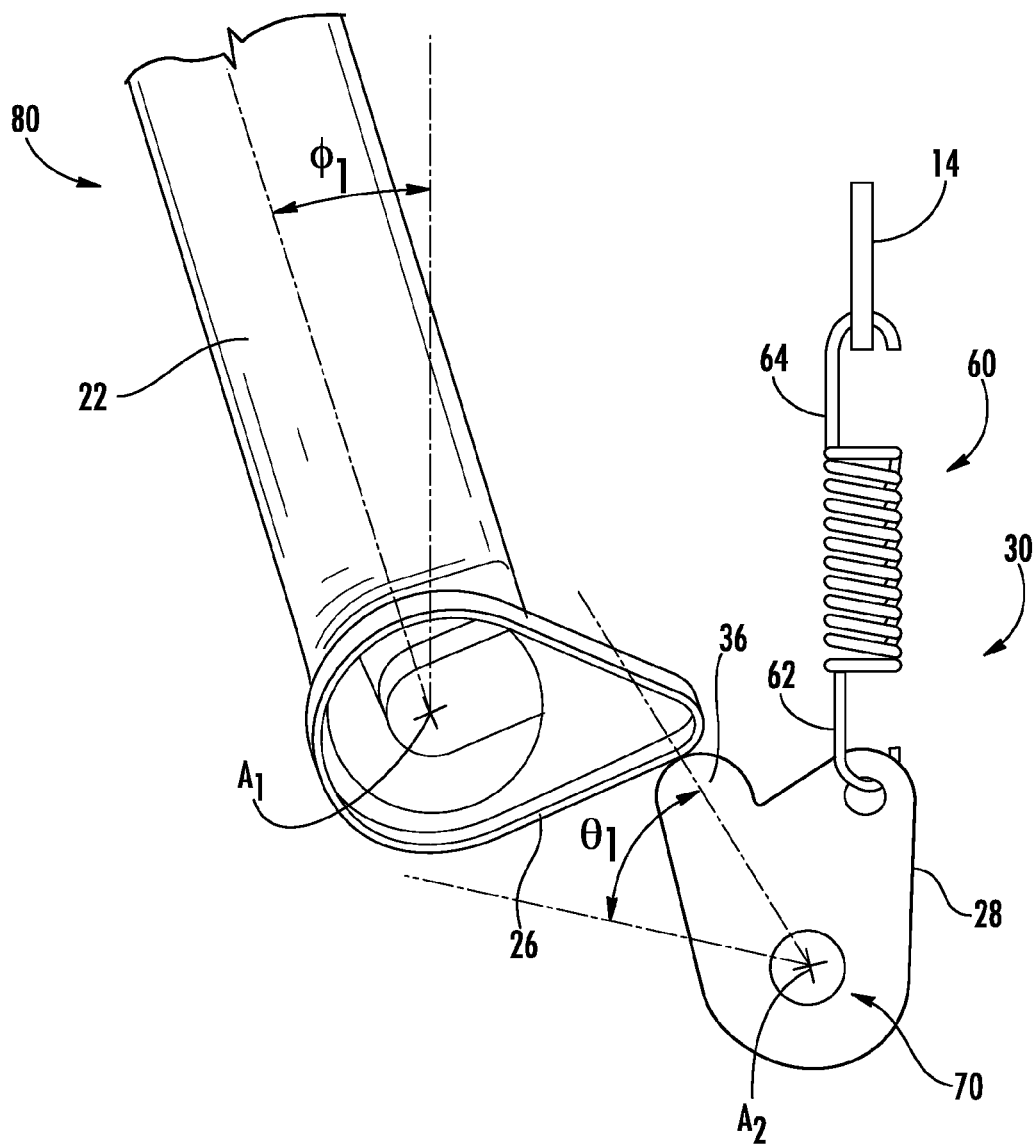
FIG. 4A is a cutaway view illustrating a mechanism for a drive by wire control system in a first position according to an embodiment of the presently disclosed subject matter.
Figure 4B:
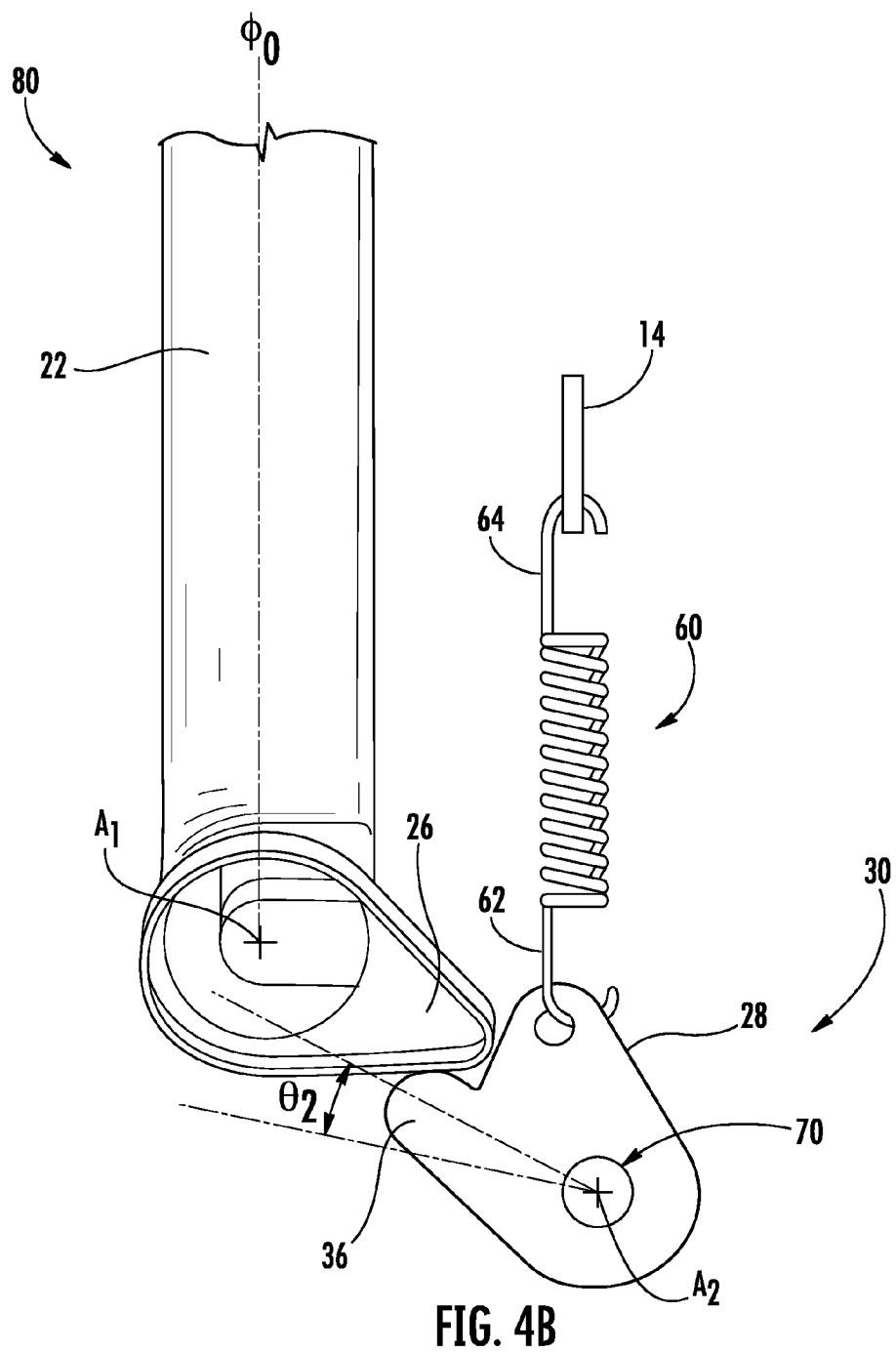
FIG. 4B is a cutaway view illustrating a mechanism for a drive by wire control system in a second position according to an embodiment of the presently disclosed subject matter.

A cutaway view illustrating an internal configuration of mechanism 80 can be seen in FIGS. 4A and 4B. In some aspects, mechanism 80 can comprise an internal clutch cam 26 disposed on a portion of clutch lever 22. Clutch cam 26 can be disposed within housing 12 and can project away from a surface of clutch lever 22. Clutch cam 26 can be integral to or can be fixedly attached to clutch lever 22. Clutch cam 26 can be configured to be coupled, such that it can engage with a sensor cam 36 of sensor 30. For example, as clutch lever 22 is pivoted between angular positions, clutch cam 26 can rotate about a central axis A1 into engagement with sensor cam 36. Sensor cam 36 is configured such that upon engagement of sensor cam 36 with clutch cam 26, sensor cam 36 can be rotated about a sensor axis A2. Angular rotation of sensor cam 36, and inherently sensor 30, about axis A2 can be measured in degrees or radians.

Thus, clutch cam 26 can be configured to be at a maximum displacement position $\phi_1$ when clutch lever 22 is in the first angular position (see, for e.g., FIG. 4A) or grip portion of clutch lever 22 is spaced apart from handle 24 by the first angle. Conversely, clutch cam 26 can be configured to be at an equilibrium position $\phi_0$ when clutch lever 22 is in the second angular position (see, for e.g. FIG. 4B) or grip portion is comparatively closer to handle 24. In some aspects, if clutch lever 22 is pivoted from the first angular position (i.e., component 50 is in OFF state) to the second angular position (i.e., component 50 is in MAX state), clutch cam 26 can rotate in a clockwise direction about central axis A1 from maximum displacement position $\phi_1$ into equilibrium position $\phi_0$. For example, rotation of clutch cam 26 from maximum displacement position $\phi_1$ into equilibrium position $\phi_0$ (i.e., the second angular position) can be 30 degrees in a clockwise direction about central axis A1. Therefore, rotation of clutch lever 22 between the first and the second angular position, and vice versa, can comprise a maximum rotational distance that clutch cam 26 can travel.

Accordingly, as clutch cam 26 pivots about central axis A1, operator force applied to clutch lever 22 can overcome a tension force in a clutch return spring 60 and can become coupled with or engage sensor cam 36. Since operator force applied to clutch cam 26 can be greater than the tension force in clutch return spring 60, sensor cam 36 can rotate in a counterclockwise direction about a sensor axis A2. As a result, sensor cam 36 can be configured to be at a first angular rotation $\theta_1$ from an equilibrium position $\theta_0$ when clutch lever 22 is in the first angular position, and at a second angular rotation $\theta_2$ from an equilibrium position $\theta_0$ when clutch lever 22 is in the second angular position. For example, in some aspects, first angular rotation $\theta_1$ can be 50 degrees from equilibrium position $\theta_0$ of sensor cam 36, and second angular rotation $\theta_2$ can be 20 degrees from equilibrium position $\theta_0$ of sensor cam 36. Thus, as clutch lever 22 is pivoted from the first angular position to the second angular position, clutch cam 26 can pivot clockwise about axis A1 into equilibrium position $\phi_0$ and sensor cam 36 can pivot 30 degrees counterclockwise about axis A2 from the first angular rotation $\theta_1$ into second angular rotation $\theta_2$.

Conversely, for example, if clutch lever 22 is released (i.e. operator force is removed from clutch lever 22), from the second angular position back into the first angular position, clutch cam 26 can pivot counterclockwise about axis A1 into maximum displacement position $\phi_1$. Consequently, the lack of operator applied force can allow a tension force in clutch return spring 60 to overcome a torque exerted by a sensor return spring 70, such that sensor cam 36 can pivot clockwise about axis A2 from second angular rotation $\theta_2$ into first angular rotation $\theta_1$.

Similarly, one of ordinary skill in the art will understand how moving clutch lever 22 into intermediate angular positions (e.g., a third angular position) can cause clutch cam 26 to rotate about axis A1 such that it has an angular position between maximum angular displacement position $\phi_1$ and equilibrium position $\phi_0$. For example, the third angle can be between about 0 degrees and 30 degrees. Similarly, if clutch lever 22 is moved into the third angular position, rotation of clutch cam 26 into an angular position between maximum angular displacement position $\phi_1$ and equilibrium position $\phi_0$ can cause sensor cam 36 to rotate in a clockwise or counterclockwise direction and have an angular rotation between $\theta_1$ and $\theta_2$. For example, sensor cam 36 can rotate between 20 degrees and 50 degrees, from equilibrium position $\phi_0$.

Within housing 12, clutch return spring 60 can indirectly communicate with clutch lever 22 and can directly communicate with sensor 30. In one aspect, clutch return spring 60 can comprise two ends. A first end 62 of clutch return spring 60 can be connected to sensor 30, while a second end 64 of clutch return spring 60 can be connected to any suitable foundation point within housing 12 that anchors spring 60. In some aspects, for example, second end 64 can be connected to a removable spring plate 14 that can be independently removable from housing 12, while first end 62 can be connected to a protrusion 28 extending from a portion of sensor 30 (see, e.g. FIGS. 4A-4B). In particular, ends 62, 64 of clutch return spring 60 can hook into openings in protrusion 28 and removable spring plate 14, respectively.

Accordingly, clutch return spring 60 can be, for e.g., a tension spring designed to operate with a tension load. In some aspects, clutch return spring 60 can deflect based on a force applied, the force applied being dependent upon an amount of operator force applied to clutch lever 22. Thus, clutch return spring 60 can be configured to be at an equilibrium length when clutch lever 22 is in a first angular position (see, for e.g., FIG. 4A) and at a maximum displacement length when clutch lever 22 is in a second angular position (see, for e.g., FIG. 4B). As a result, if the operator wishes to pivot clutch lever 22 into the second angular position from the first angular position, the force applied to clutch lever 22 must be sufficient to overcome the spring constant or force constant of spring 60 in order to deform and/or extend spring 60 from the equilibrium length to the maximum displacement length for the present system. Conversely, if the operator then releases clutch lever 22 from the second angular position into either the first or a third angular position, a displacement length of spring 60 can decrease from a maximum displacement length for the present system to its equilibrium length or some other extended length.

With regard to sensor 30, sensor 30 can comprise a sensor cam 36, as well as protrusion 28 for connecting to clutch return spring 60. In one aspect, sensor cam 36 can be a coplanar surface extension integral to an exterior surface of sensor 30 and can be coupled with and/or engage clutch cam 26. When engaged, clutch cam 26 can cause sensor cam 36 to rotate about axis A2. Since sensor cam 36 can be an integral component of sensor 30, any angular rotation of sensor cam 36 inherently can cause rotation of sensor 30. Thus, sensor 30 can also be rotatable about sensor axis A2. Angular rotation of sensor 30 about sensor axis A2 can cause sensor 30 to register an electrical angle or degree of mechanical travel. Mechanical travel is defined as the angle at which sensor 30 can rotate from its equilibrium position $\theta_0$, and can be measured in either degrees or radians. In some aspects, for example, sensor 30 can be configured as a potentiometer or a Hall Effect sensor with a maximum degree of mechanical travel from an equilibrium position $\theta_0$. Mechanical travel of sensor 30 can be measured in view of a sensor return spring 70, which can be, for example, a torsion spring. Where sensor return spring 70 is a torsion spring, sensor return spring 70 can exert a torque that is dependent on an angle of rotation from an equilibrium position $\theta_0$ and a spring constant.

Sensor return spring 70 can be disposed integrally to sensor 30. According to one aspect of the present subject matter, sensor return spring 70 can be configured to bias sensor 30 both clockwise and counterclockwise about sensor axis A2 back to an equilibrium position $\theta_0$ of sensor 30. Since sensor 30 can be directly coupled to clutch return spring 60, for e.g., by way of protrusion 28 connected to first end 62 of clutch return spring 60, the magnitude that sensor 30 can rotate about axis A2 can directly affect extension of clutch return spring 60; where the magnitude of sensor rotation can be dependent on both the force of clutch return spring 60 and the operator force on clutch lever 22 in relation to the torque exerted by sensor return spring 70.

In some aspects, the force exerted clutch return spring 60 can be significantly greater than the torque exerted by sensor return spring 70. For example, clutch return spring 60 can exert a force that can counteract the torque exerted by sensor return spring 70 about axis A2. Thus, when clutch lever 22 is in a first position (i.e., no operator force is applied), clutch return spring 60 can remain at its equilibrium displacement length and sensor 30 can be rotated clockwise and held at a first angular rotation $\theta_1$ with regard to axis A2. For example, the force of clutch return spring 60 can bias sensor 30 in a first angular rotation $\theta_1$ of 50 degrees when clutch lever 22 is in the first angular position. Conversely, when clutch lever 22 is in a second position (i.e., maximum operator force is applied), clutch return spring 60 can be extended to its maximum displacement length (as a result of operator force) and sensor 30 can be rotated counterclockwise and held at a second angular rotation $\theta_2$ with regard to axis A2. For example, the force of clutch return spring 60 in combination with the operator force on lever 22 can bias sensor 30 in a second angular rotation $\theta_2$ of 20 degrees when clutch lever 22 is in the second angular position.

Accordingly, mechanism 80 is configured such that if any component in drive by wire control system 10 becomes inoperative, no signal can be communicated from sensor 30 to control unit 40. This is due to the built-in redundancy configuration of mechanism 80.

Drive by wire control system 10 can become inoperative if clutch return spring 60 becomes inoperative, sensor return spring 70 becomes inoperative, or both become inoperative. In any of these three scenarios, mechanism 80 can ensure that output to transmission 60 ceases. However, one of ordinary skill in the art will recognize that any number of other components and/or mechanisms of drive by wire control system 10 can become inoperative. Other components becoming inoperative are outside the scope of this application, though, and will not be discussed herein.

Figure 5:
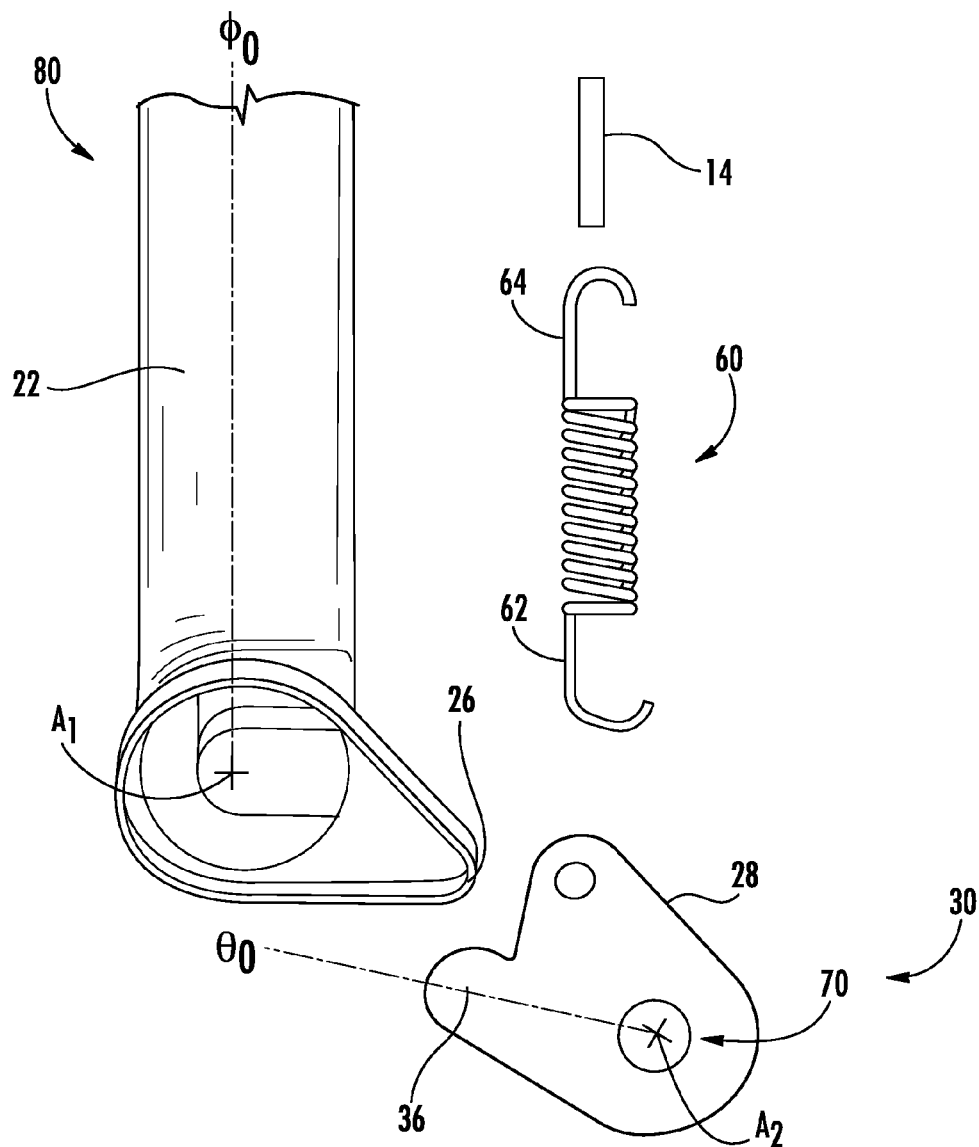
FIG. 5 is a cutaway view illustrating a mechanism during a first inoperative scenario for a drive by wire control system according to an embodiment of the presently disclosed subject matter.

With regard to a conventional drive by wire control system becoming inoperative, such a system can be configured without any fallback capabilities, such that the transmission can remain on regardless of whether an operator has released a clutch control into a default or off position. By contrast, drive by wire control system 10, according to some embodiments of the present subject matter, can utilize a mechanism 80 in order to ensure that machine M does not remain on if drive by wire control system 10 becomes inoperative. In some aspects, and as illustrated in FIG. 5, clutch return spring 60 can become inoperative at either one or both ends 62, 64. For example, first end 62 of spring 60 can become disconnected or uncoupled from protrusion 28 of sensor 30 and/or second end 64 can become disconnected or uncoupled from removable spring plate 14 or any other suitable foundation within housing 12. As illustrated in FIG. 5, both ends 62, 64 of spring 60 have become disconnected or uncoupled from their respective connections. Thus, where clutch return spring 60 has become inoperative, there is no external force counteracting the torque exerted by sensor return spring 70. Accordingly, regardless of whether an operator releases clutch lever 22 back into the first angular position, sensor return spring 70 can bias sensor 30 counterclockwise about sensor axis A2 into equilibrium position $\theta_0$. By definition, when sensor 30 is at equilibrium position $\theta_0$ there has been no rotation of sensor 30. Consequently, at equilibrium position $\theta_0$ of sensor 30 no electrical angle or degree of mechanical travel about axis A2 has occurred (i.e., the electrical angle equals approximately 0 degrees), and a signal indicative of such can be transmitted to control unit 40.

Additionally, when sensor 30 is at its equilibrium position $\theta_0$, sensor cam 36 can be out of range of clutch cam 26 without contacting clutch cam 26, such that if operator pivots clutch lever 22 from a second angular position into a first angular position (and vice versa), clutch cam 26 will not couple with sensor cam 36. This fallback feature can ensure that machine M will remain off until drive by wire control system 10 is fixed.

Figure 6:
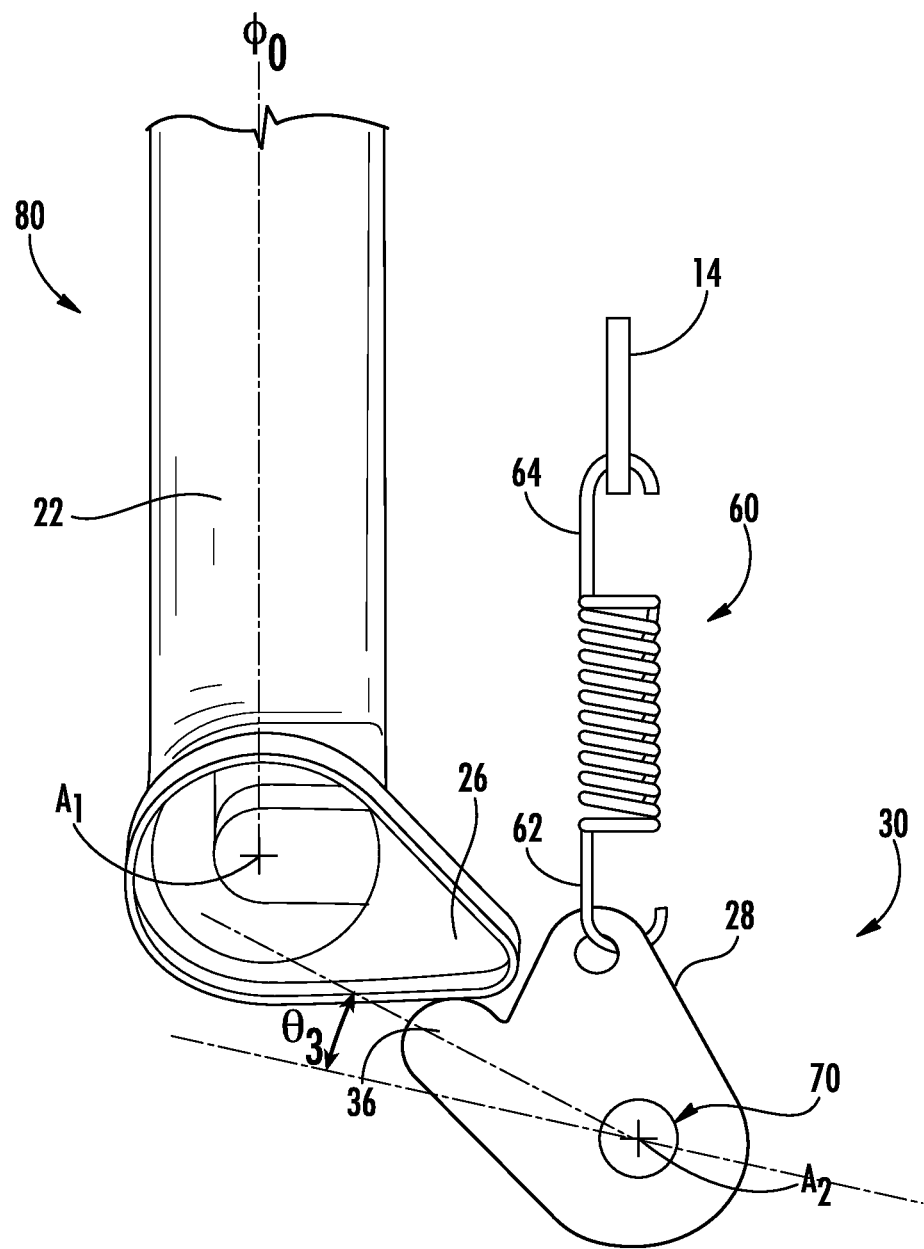
FIG. 6 is a cutaway view illustrating a mechanism during a second inoperative scenario for a drive by wire control system according to an embodiment of the presently disclosed subject matter.

With regard to sensor return spring 70 becoming inoperative, clutch return spring 60 can act as a fallback mechanism. For example, sensor return spring 70 can become inoperative due to resonance from vibration, a manufacturing defect, improper assembly, over use, etc. In some aspects, sensor return spring 70 becoming inoperative can result in an inability of spring 70 to exert any torque. Thus, any force exerted by clutch return spring 60 onto sensor return spring 70 will not be countered by any torque exerted by sensor return spring 70. As illustrated in FIG. 6, for example, this can cause sensor return spring 70 to be biased into a third angular rotation $\theta_3$ past equilibrium position $\theta_0$. As a result, clutch return spring 60 can be at an equilibrium length. For example, third angular rotation $\theta_3$ can be greater than 10 degrees past equilibrium position $\theta_0$. In some aspects, third angular rotation $\theta_3$ can be an electrical angle that is "out of range", where "out of range" can refer to predetermined in range and out of range values defined by a software module configured to be run by control unit 40. Therefore, if an angular rotation is transmitted to control unit 40 and is not within the predetermined "in range" values, then the software module will cut power to transmission motor 50. This feature is described in more detail below. Consequently, sensor 70 can transmit a signal corresponding to third angular rotation $\theta_3$ to control unit 40.

Additionally, when sensor 30 is rotated third angular rotation $\theta_3$ past equilibrium position $\theta_0$, sensor cam 36 can be out of range of clutch cam 26 without contacting clutch cam 26. As a result, if operator pivots clutch lever 22 from a second angular position into a first angular position (and vice versa), clutch cam 26 will not couple with sensor cam 36. This fallback feature can ensure that machine M will remain off until drive by wire control system 10 is fixed.

Figure 7:
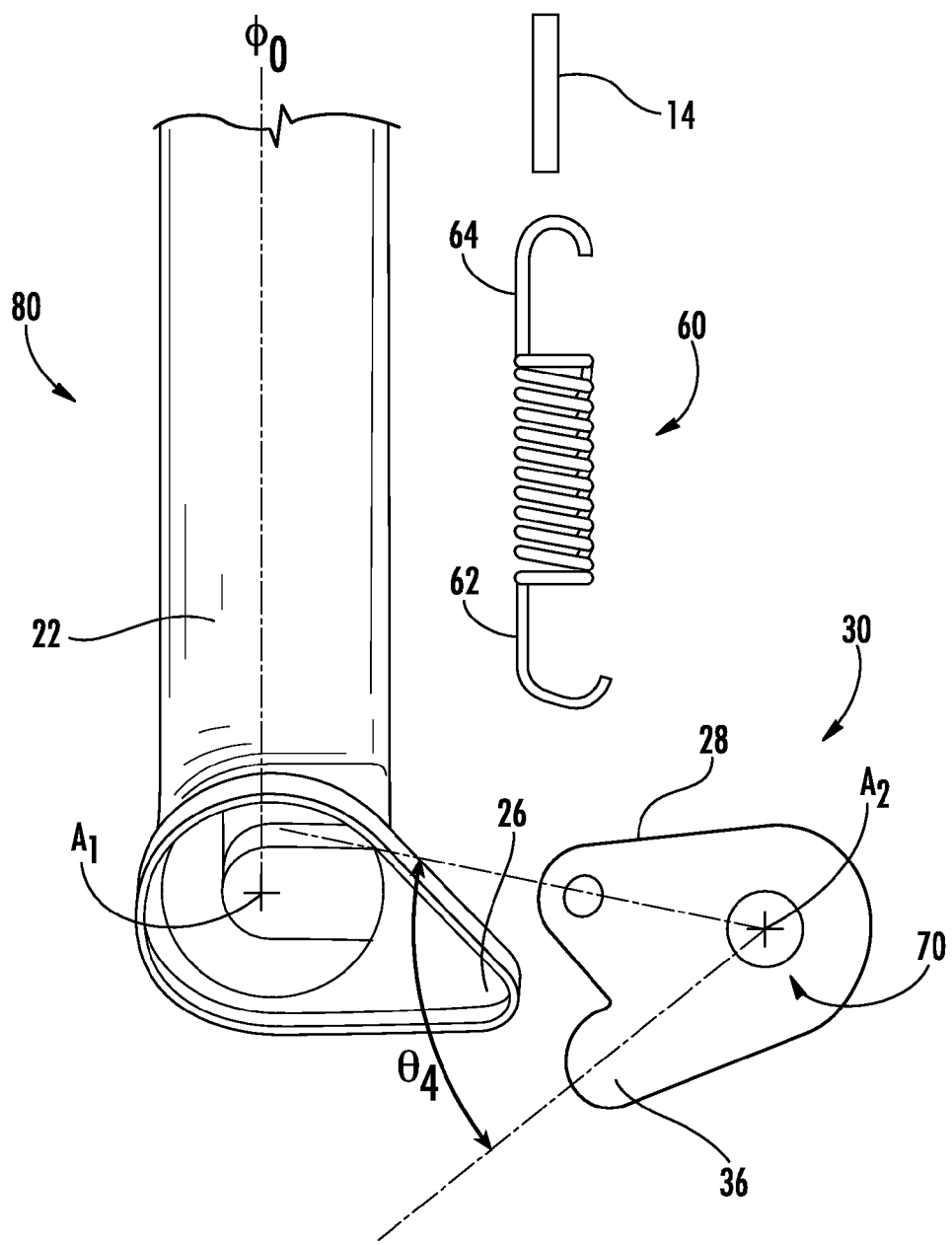
FIG. 7 is a cutaway view illustrating a mechanism during a third inoperative scenario for a drive by wire control system according to an embodiment of the presently disclosed subject matter.

With regard to both sensor return spring 70 and clutch return spring 60 becoming inoperative, gravity can act as a fallback measure. Both sensor return spring 70 and clutch return spring 60 can become inoperative in the ways discussed above or in any other manner. As illustrated in FIG. 7, both ends 62, 64 of spring 60 have become disconnected or uncoupled from their respective connections. In some aspects, both springs becoming inoperative can result in an inability of spring 70 to exert any torque and spring 60 to exert any force. Thus, as illustrated in FIG. 7, for example, once an operator releases clutch lever 22, gravity can cause sensor 30 to rotate counterclockwise about sensor axis A2 into a fourth angular rotation $\theta_4$ past equilibrium position $\theta_0$. For example, fourth angular rotation $\theta_4$ can be more than 10 degrees past equilibrium position $\theta_0$. In some aspects, fourth angular rotation $\theta_4$ can be an electrical angle that is also "out of range". Consequently, sensor 70 can transmit a signal corresponding to fourth angular rotation $\theta_4$ to control unit 40.

Additionally, when sensor 30 is rotated past equilibrium position $\theta_0$ to fourth angular rotation $\theta_4$, sensor cam 36 can be out of range of clutch cam 26 without contacting clutch cam 26. As a result, if operator pivots clutch lever 22 from a second angular position into a first angular position (and vice versa), clutch cam 26 will not couple with sensor cam 36. This fallback feature can ensure that machine M will remain off until drive by wire control system 10 is fixed.

Accordingly, a magnitude of mechanical travel or electrical angle can be communicated to control unit 40 from sensor 30. The control unit 40 can be configured such that the mechanical travel communicated to control unit 40 can correspond to the control output transmitted by control unit 40 to the machine component (e.g. transmission 50) of walk-behind working machine M. For example, sensor 30 can communicate the magnitude of its rotation about axis A2 in the form of a control signal or pulse (e.g. voltage signal) to control unit 40, where control unit 40 can be configured to interpret the input control signal or pulse to determine whether the input control signal or pulse is within a predetermined acceptable range. Only where the degree of mechanical travel is within the predetermined acceptable range can control unit 40 transmit a control output to the machine component of walk-behind working machine M. This can prevent machine M from remaining on once operator releases clutch lever 22 back into a first position if any component of drive by wire control system 10 has become inoperative. Additionally, a tolerance buffer can be built into the predetermined acceptable range such that slight deviations in degree of mechanical travel do not automatically indicate that sensor 30 is out of range. For example, the tolerance buffer can be approximately between 10° and 20°, and 50° and 60°, as seen in FIG. 8.

In one aspect, the predetermined acceptable range of mechanical travel can be a control scheme that can be implemented by control unit 40, where a range of mechanical travel can linearly correspond to a control output (e.g., output voltage) transmitted by control unit 40 to a machine component 50 of walk-behind working machine M. Specifically, the scheme can be incorporated into control unit 40 and can be used to compare the input control signal from sensor 30 against an "acceptable" predetermined signal range.

Figure 8:
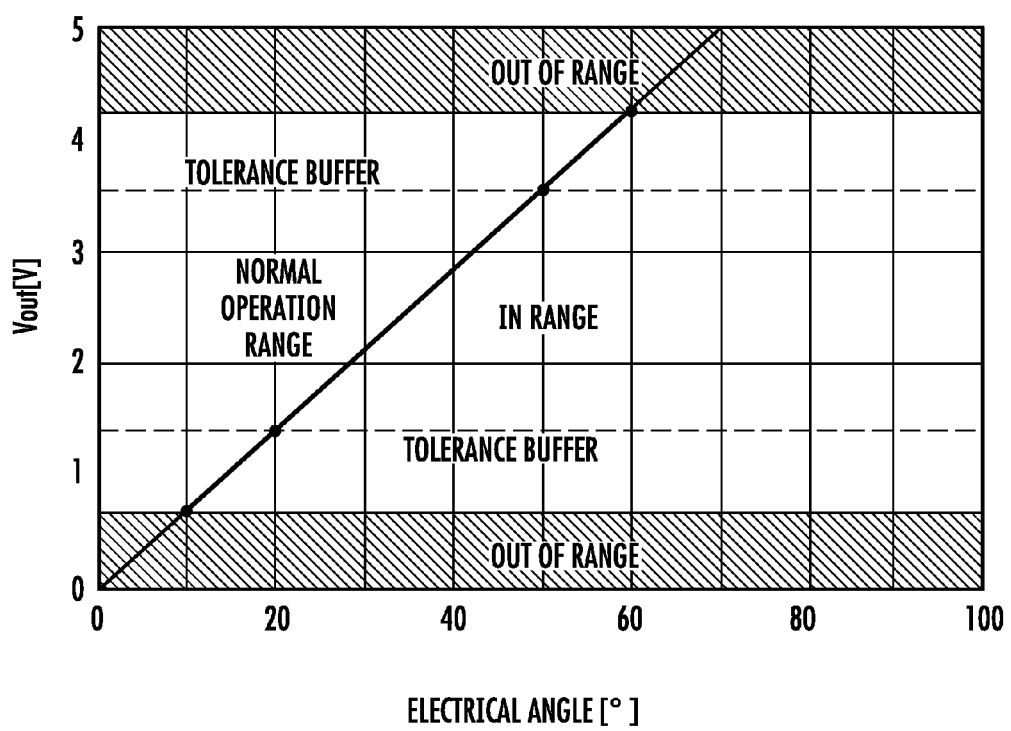
FIG. 8 is an exemplary graphical representation illustrating a sensor voltage output range of a sensor for a drive by wire control system according to an embodiment of the presently disclosed subject matter.

For example, FIG. 8 illustrates the linear relationship between degree of mechanical travel and the output voltage in a scheme to be implemented by control unit 40 according to some aspects of the present subject matter. In FIG. 8, the sensor control output range incorporated into control unit 40 can comprise a sensor voltage output range and the input signal communicated from sensor 30 can comprise an input voltage signal that is interpreted in terms of electrical angle. Thus, the linear relationship illustrates that the higher the degree of mechanical travel, the greater the output voltage to be transmitted (and vice versa).

Referring to FIG. 8, a normal operating range of sensor 30 can be an electrical angle between approximately 20° and 50°. Consequently, where angular rotation of sensor 30 is approximately 20°<θ<50 can the corresponding control signal communicated to control unit 40 be within the predetermined range. If the input control signal is within the predetermined range, control unit 40 can subsequently transmit a corresponding output voltage to transmission 50. In such a case, transmission 50 can be in an operating state. As a note, for example, where clutch lever 22 is in the first angular position and angular rotation of sensor 30 is at 50°, or $\theta_1$, transmission 50 can be in an OFF state. Conversely, where clutch lever 22 is in the second angular position and angular rotation of sensor 30 is at 20°, or $\theta_2$, transmission 50 can be in a MAX operating state. However, where drive by wire control system 20 has become inoperative, for whatever reason, and angular rotation of sensor 30 is 0°<θ<20° and θ>50°, for example, can the corresponding control signal communicated to control unit 40 be outside the predetermined range. In such a case, control unit 40 will not transmit a corresponding output voltage to transmission 50 (i.e., transmission 50 will be in an OFF state).

In this regard, when drive by control system 10 is working, if clutch lever 22 is in a first angular position, sensor 30 can be at a first angular rotation $\theta_1$ past equilibrium position $\theta_0$ (see, for e.g., FIG. 4A). No output voltage can be communicated to transmission 50 (i.e., OFF operating state). Conversely, if clutch lever 22 is pivoted into a second angular position, sensor 30 can be at a first angular rotation $\theta_2$ past equilibrium position $\theta_0$ (see, for e.g., FIG. 4B). Maximum output voltage can be communicated to transmission 50 (i.e., MAX operating state). Any other range of position of clutch lever 22 between the first angular position and the second angular position can result in sensor 30 being at an angular rotation within a predetermined range of mechanical travel, and a corresponding voltage output can be transmitted to transmission 50.

Figure 9:
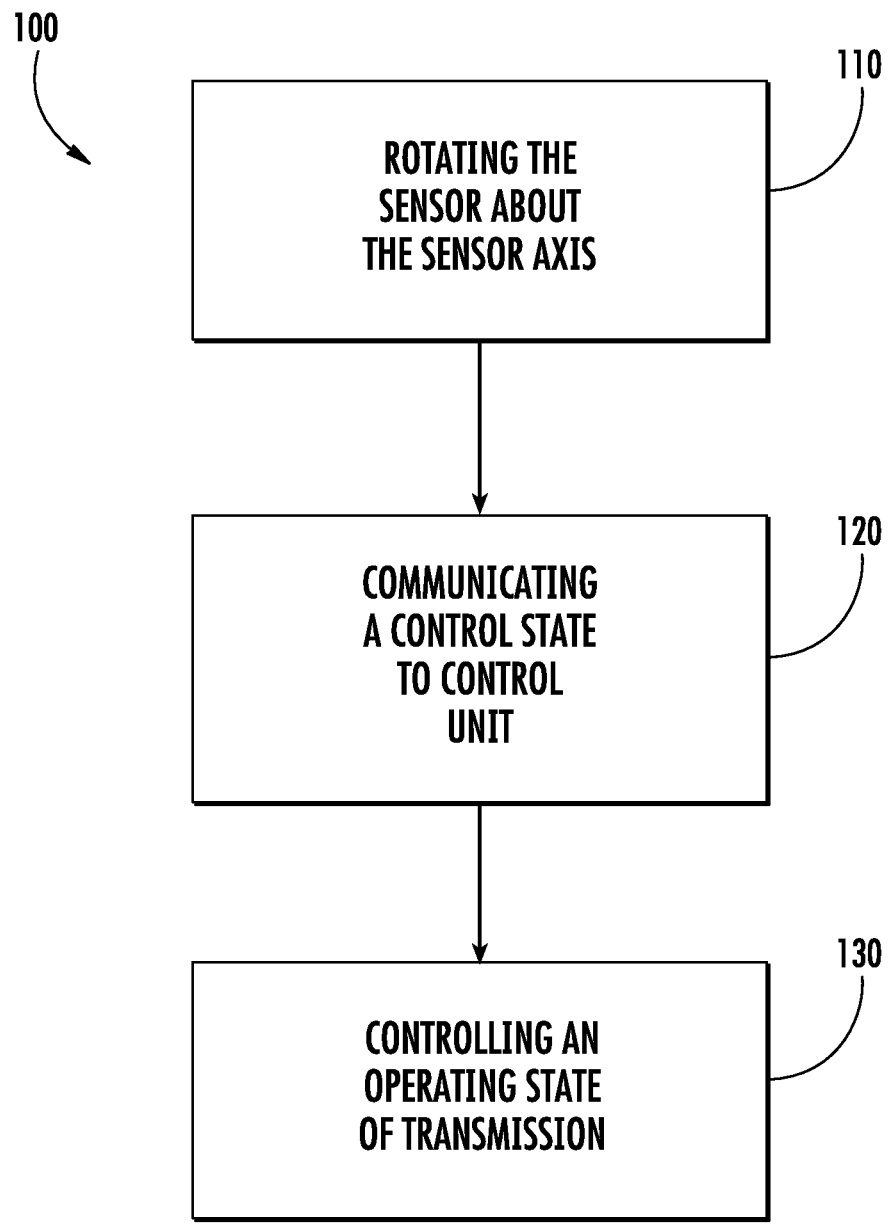
FIG. 9 is a flow chart illustrating an exemplary method for utilizing a mechanism for a drive by wire control system in a walk-behind working machine according to an embodiment of the presently disclosed subject matter.

FIG. 9 is a flow chart illustrating an exemplary method, generally designated 100, for operating a drive by wire control system 10 in a walk-behind working machine M. Drive by wire control system 10 can be a system similar to the ones discussed above, and can comprise a clutch control 20, a sensor 30, a control unit 40, and/or a transmission 50. (See, for e.g., FIG. 2).

In some embodiments, method 100 can comprise a rotating step, generally designated step 110. For example, step 110 can comprise rotating a sensor 30 about a sensor axis A2. Method 100 can further comprise a communicating step, generally designated step 120. For example, step 120 can comprise communicating a control signal to a control unit 40. In some aspects, the control signal can correspond to a magnitude of rotation of the sensor 30 about the sensor axis A2. Method 100 can also comprise a controlling step, generally designated step 130. For example, step 130 can comprise controlling an operating state of a transmission 50 of the walk-behind machine M. In some aspects, upon drive by wire control system 10 becoming inoperative, an operating state of transmission 30 can be non-operational. One of ordinary skill in the art can appreciate that method 100 and steps 110-130 illustrated in FIG. 9 are illustrative of only some embodiments of the present subject matter, and different steps and/or arrangements of said steps are contemplated.

Figure 10:
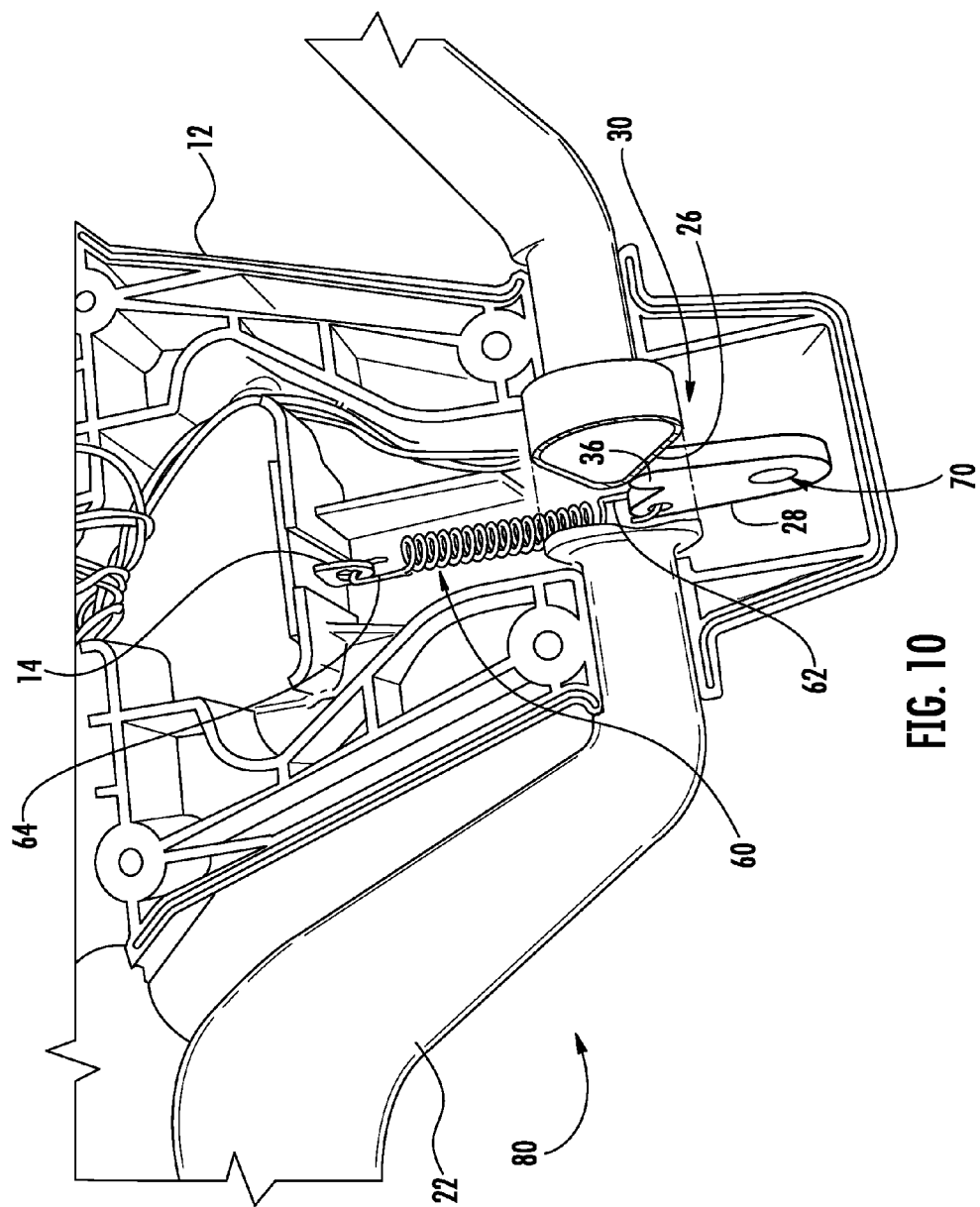
FIG. 10 is a front perspective view illustrating a mechanism for a drive by wire control system disposed within an interior of a housing according to an embodiment of the presently disclosed subject matter.

Referring to FIG. 10, a front perspective view of an interior of a housing 12 illustrates the structural and/or functional connections between mechansim 80 (see , for example, FIGS. 4A-7) within housing 12 and clutch lever 22 (see, for example, FIGS. 3A-3B). For example, clutch cam 26 of mechanism 80 is disposed within housing 12 and projects away from a surface of clutch lever 22. Clutch cam 26 can be configured to be coupled, such that it can engage with a sensor cam 36 of sensor 30. FIG. 10 also illustrates how clutch return spring 60 of mechanism 80 can indirectly communicate with clutch lever 22 and can directly communicate with sensor 30. First end 62 of clutch return spring 60 can be connected to protrusion 28 on sensor 30, while a second end 64 of clutch return spring 60 can be connected removable spring plate 14 that can be independently removable from housing 12. In particular, ends 62, 64 of clutch return spring 60 can hook into openings in protrusion 28 and removable spring plate 14, respectively.

While the present subject matter has been has been described herein in reference to specific aspects, features, and illustrative embodiments, it will be appreciated that the utility of the invention is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, aspects, modifications and alternative embodiments, within its scope and including equivalents of the claims.

What is claimed is:

1. A walk-behind working machine comprising:
   a drive by wire control system comprising:
      a transmission,
      a control unit configured to control an operating state of the transmission, and
      a mechanism comprising:
         a sensor rotatable about a sensor axis and in communication with the control unit, and
         a first and a second resilient member, the first resilient member comprising a sensor return spring coupled to the sensor and configured to bias the sensor about the sensor axis into an equilibrium position of the sensor, and the second resilient member comprising a clutch return spring coupled to the sensor and configured to bias the sensor clockwise about the sensor axis;
      wherein the mechanism is configured such that if the drive by wire control system becomes inoperative, a change in the operating state of the transmission occurs, such that the transmission is non-operational if the drive by wire control system becomes inoperative;
      wherein the sensor is configured to communicate to the control unit a control signal that corresponds to an electrical angle of the sensor, the electrical angle being measured, by the sensor, as a magnitude of rotation of the sensor about the sensor axis, and
      wherein the control unit is configured to interpret the control signal and transmit a corresponding output voltage to the transmission of the walk-behind working machine when the electrical angle of the sensor is within a predetermined acceptable range.

2. The walk-behind working machine of claim 1, wherein the drive by wire control system becomes inoperative as a result of one or both of the sensor return spring and the clutch return spring becoming inoperative.

3. The walk-behind working machine of claim 1, further comprising:
   a clutch lever disposed relative to a handle of the walk-behind machine, the clutch lever being selectively pivotable with respect to the handle between a first angular position and a second angular position; and
   a clutch cam disposed on the clutch lever and configured to couple with and rotate a sensor cam of the sensor counterclockwise about the sensor axis when the clutch lever is pivoted from the first angular position to the second angular position.

4. The walk-behind working machine of claim 1, wherein the drive by wire control system becoming inoperative results in the electrical angle of the sensor falling outside the predetermined acceptable range, such that no output voltage is transmitted by the control unit to the transmission of the walk-behind working machine and the transmission is non-operational.

5. The walk-behind working machine of claim 1, wherein the walk-behind working machine is a lawnmower.

6. A method for operating a drive by wire control system in a walk-behind working machine, the method comprising:
   coupling a first resilient member to a sensor to bias the sensor about a sensor axis into an equilibrium position of the sensor, the first resilient member comprising a sensor return spring;
   coupling a second resilient member to the sensor to bias the sensor clockwise about the sensor axis, the second resilient member comprising a clutch return spring;
   rotating the sensor about the sensor axis;
   communicating, by the sensor, a control signal to a control unit; and
   controlling, by the control unit, an operating state of a transmission of the walk-behind machine such that if the drive by wire control system becomes inoperative, a change in the operating state of the transmission occurs, such that the transmission is non-operational if the drive by wire control system becomes inoperative.

7. The method of claim 6, wherein the drive by wire control system becomes inoperative as a result of one or both of the sensor return spring and the clutch return spring becoming inoperative.

8. The method of claim 6, further comprising:
   selectively pivoting a clutch lever with respect to a handle of the walk-behind machine between a first angular position and a second angular position; and
   coupling a clutch cam with the sensor, the clutch cam being disposed on the clutch lever and being configured to rotate a sensor cam of the sensor counterclockwise about the sensor axis when the clutch lever is pivoted from the first angular position to the second angular position.

9. The method of claim 6, wherein the control signal corresponds to an electrical angle of the sensor, and wherein controlling the operating state of the transmission comprises transmitting a corresponding output voltage to the transmission when the electrical angle of the sensor is within a predetermined acceptable range.

10. The method of claim 9, wherein the drive by wire control system becoming inoperative results in the electrical angle of the sensor falling outside the predetermined acceptable range, such that no output voltage is transmitted by the control unit to the transmission of the walk-behind working machine and the transmission is non-operational.

* * * * *